(12) United States Patent
Choi

(10) Patent No.: US 9,476,331 B2
(45) Date of Patent: Oct. 25, 2016

(54) CONTROL APPARATUS OF ENGINE HAVING VARIABLE VALVE LIFT APPARATUS AND A METHOD THEREOF

(71) Applicant: Hyundai Motor Company, Seoul (KR)

(72) Inventor: Byong Young Choi, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 69 days.

(21) Appl. No.: 14/341,557

(22) Filed: Jul. 25, 2014

(65) Prior Publication Data

US 2015/0176444 A1    Jun. 25, 2015

(30) Foreign Application Priority Data

Dec. 19, 2013  (KR) .................. 10-2013-0159333

(51) Int. Cl.
*F01L 1/34*  (2006.01)
*F01L 13/00*  (2006.01)
*F02D 13/06*  (2006.01)

(52) U.S. Cl.
CPC ........... *F01L 13/0015* (2013.01); *F02D 13/06* (2013.01); *Y02T 10/18* (2013.01)

(58) Field of Classification Search
CPC ..... F01L 13/0015; F02D 13/06; Y02T 10/18
USPC ................ 123/90.16, 90.15, 90.17; 464/160
See application file for complete search history.

(56) References Cited

U.S. PATENT DOCUMENTS 7,021,259 B2    4/2006  Machida
7,950,359 B2 *  5/2011  Choi .................. F01L 1/344
                                                 123/90.15

FOREIGN PATENT DOCUMENTS

JP    7-119502 A       5/1995
JP    2002-295274 A    10/2002
JP    2011-214403 A    10/2011
KR    10-2012-0124774 A   11/2012

* cited by examiner

*Primary Examiner* — Ching Chang
(74) *Attorney, Agent, or Firm* — Morgan, Lewis & Bockius LLP

(57) ABSTRACT

A control apparatus of an engine may include a variable valve lift apparatus, an engine including a plurality of cylinders generating power by combustion of fuel, at least one intake valve and at least one exhaust valve for opening and closing the cylinder, a variable valve lift apparatus adjusting a valve lift of the intake valve and exhaust valve, and a controller driving the intake valve in a low lift mode by using the variable valve lift apparatus and closing the exhaust valve when one of the cylinders among the plurality of cylinders may be deactivated.

4 Claims, 3 Drawing Sheets

(a)

(b)

(a)

(b)

CONTROL APPARATUS OF ENGINE HAVING VARIABLE VALVE LIFT APPARATUS AND A METHOD THEREOF

CROSS-REFERENCE TO RELATED APPLICATION

The present application claims priority to and the benefit of Korean Patent Application No. 10-2013-0159333 filed on Dec. 19, 2013, the entire contents of which is incorporated herein for all purposes by this reference.

BACKGROUND OF THE INVENTION

1. Field of the Invention

The present invention relates to a control apparatus of an engine having a variable valve lift apparatus and a method thereof. More particularly, the present invention relates to a control apparatus of an engine having a variable valve lift apparatus and a method for constantly maintaining pressure of a cylinder by driving an intake valve or an exhaust valve in a low lift mode when a cylinder is in an idle state.

2. Description of Related Art

In general, an internal combustion engine generates power by taking in fuel and air and burning it in a combustion chamber. Intake valves are operated by a camshaft in order to take in air, and air is drawn into the combustion chamber while the intake valves are open. In addition, exhaust valves are operated by the camshaft, and exhaust gas is discharged from the combustion chamber while the exhaust valves are open.

An optimal operation of the intake valves and the exhaust valves depends on the rotation speed of the engine. That is, an optimal lift or an optimal opening/closing timing of the valves depends on the rotation speed of the engine. In order to achieve such optimal valve operation depending on the rotation speed of the engine, research has been undertaken for a variable valve lift (VVL) apparatus that includes a plurality of cams for driving the valves, or varies the lift of the valves depending on the number of rotations per minute of the engine.

In a similar concept to the VVL apparatus, there is a CDA device. In general, cylinder deactivation (hereafter referred to as CDA) is a technology of deactivating some cylinders when braking or driving at a predetermined speed. During the operation of the CDA device, fuel supply to the deactivated cylinders is stopped and the operation of the intake/exhaust valves is stopped.

When a cylinder is deactivated, the intake valve and the exhaust valve are both closed, and an explosive gas or intake air is trapped in the cylinder. When the explosive gas or intake air is trapped in the cylinder, as shown in FIG. 1 (refer to arrow), there is a problem that an impact or a vibration is generated by a rapid increment of pressure in the cylinder at an initial state of cylinder deactivation.

As time passes, the pressure leaks outside of the cylinder, and thus negative pressure is formed in the cylinder. Therefore, oil flows into the cylinder.

Further, since the pressure in the cylinder is recovered to an original state when the cylinder is activated, there is a problem that fuel consumption is deteriorated.

The information disclosed in this Background of the Invention section is only for enhancement of understanding of the general background of the invention and should not be taken as an acknowledgement or any form of suggestion that this information forms the related art already known to a person skilled in the art.

BRIEF SUMMARY

Various aspects of the present invention are directed to providing a control apparatus of an engine having a variable valve lift apparatus such that an impact or vibration can be prevented by maintaining pressure in a cylinder when the cylinder is deactivated.

Further, present invention has been made in an effort to provide a control apparatus of an engine having a variable valve lift apparatus such that a negative pressure in a cylinder is prevented and inflow of oil into the cylinder can be prevented.

In an aspect of the present invention, a control apparatus of an engine having a variable valve lift apparatus, may include the engine including a plurality of cylinders generating power by combustion of fuel, at least one intake valve and at least one exhaust valve for opening and closing a cylinder, the variable valve lift apparatus adjusting a valve lift of an intake valve and an exhaust valve, and a controller driving the intake valve in a low lift mode by using the variable valve lift apparatus and closing the exhaust valve when one of the cylinders among the plurality of cylinders is deactivated.

The controller controls opening timing of the intake valve to be equivalent to top dead center or bottom dead center of a piston reciprocating in the cylinder.

The intake valve is may included as a pair, and the controller controls a first intake valve of the pair of intake valves in the low lift mode and closes a second intake valve of the pair of intake valves.

In another aspect of the present invention, a control apparatus of an engine having a variable valve lift apparatus, may include the engine including a plurality of cylinders generating power by combustion of fuel, at least one intake valve and at least one exhaust valve for opening and closing the cylinders, the variable valve lift apparatus adjusting a valve lift of an intake valve and an exhaust valve, and a controller driving the exhaust valve in a low lift mode by using the variable valve lift apparatus and closing the intake valve when one of the cylinders among the plurality of cylinders is deactivated.

The controller controls opening timing of the exhaust valve to be equivalent to top dead center or bottom dead center of a piston reciprocating in a cylinder.

The exhaust valve is may included as a pair, and the controller controls a first exhaust valve of the pair of exhaust valves in the low lift mode and closes a second exhaust valve of the pair of exhaust valves.

In further another aspect of the present invention, in a control method of an engine having a variable valve lift apparatus including at least one intake valve and at least one exhaust valve for opening and closing a cylinder provided in an engine, the variable valve lift apparatus adjusting a valve lift of an intake valve and an exhaust valve, and a controller controlling a lift of the intake valve and the exhaust valve by using the variable valve lift apparatus, the controller executes a set of instructions for determining whether the cylinder is deactivated from driving information of a vehicle, and closing the exhaust valve and driving the intake valve in a low lift mode when the cylinder is deactivated.

The controller controls opening timing of the intake valve to be equivalent to top dead center or bottom dead center of a piston reciprocating in the cylinder.

The intake valve may included as a pair, and a first intake valve of the pair of intake valves is driven in the low lift mode and a second intake valve of the pair of intake valves is closed when the cylinder is deactivated.

In another aspect of the present invention, in a control method of an engine having a variable valve lift apparatus including at least one intake valve and at least one exhaust valve for opening and closing a cylinder provided in the engine, the variable valve lift apparatus adjusting a valve lift of an intake valve and an exhaust valve, and a controller controlling a lift of the intake valve and the exhaust valve by using the variable valve lift apparatus, the controller executes a set of instructions for determining whether the cylinder is deactivated from driving information of a vehicle, and closing the intake valve and driving the exhaust valve in a low lift mode when the cylinder is deactivated.

The controller controls opening timing of the exhaust valve to be equivalent to top dead center or bottom dead center of a piston reciprocating in the cylinder.

The exhaust valve is may included as a pair, and a first exhaust valve of the pair of exhaust valves is driven in the low lift mode and a second exhaust valve of the pair of exhaust valves is closed when the cylinder is in an idle state.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
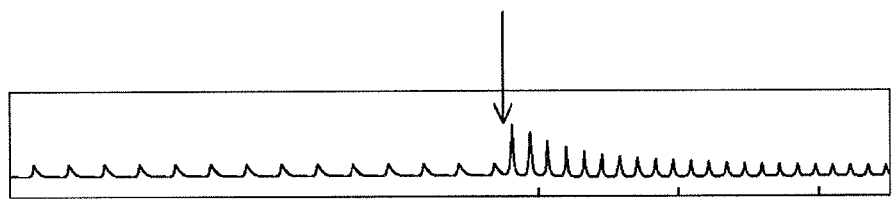
FIG. 1 is a graph illustrating a cylinder internal pressure while a cylinder is deactivated according to a related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In describing the present invention, parts that are not related to the description will be omitted. Like reference numerals generally designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

Figure 2:
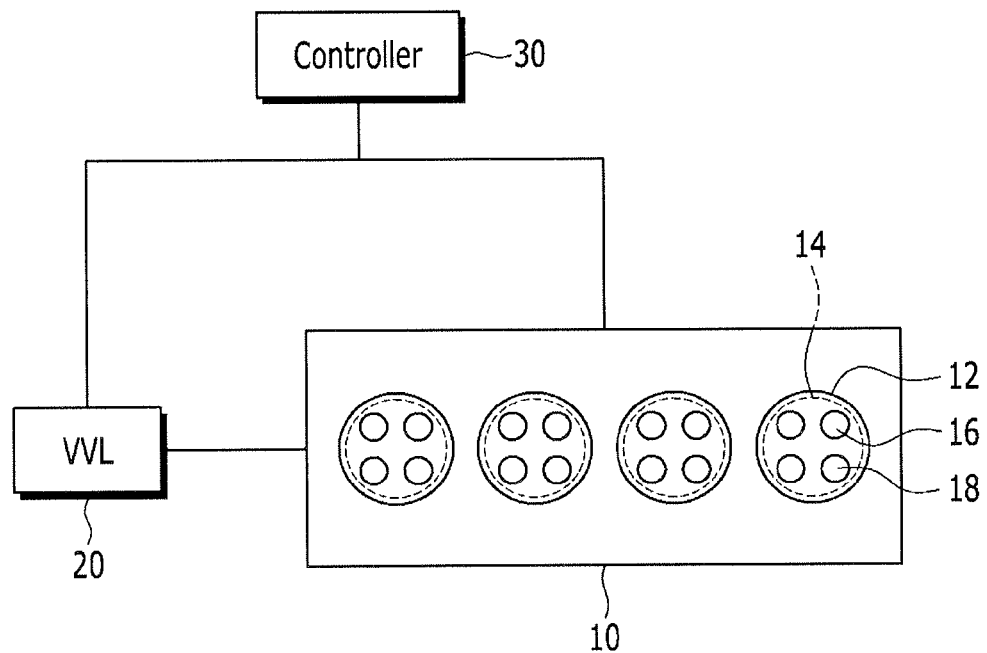
FIG. 2 is a schematic view illustrating a control apparatus of an engine having a variable valve lift apparatus according to an exemplary embodiment of the present invention.

FIG. 2 is a schematic view illustrating a control apparatus of an engine having a variable valve lift apparatus according to an exemplary embodiment of the present invention.

As shown in FIG. 2, a control apparatus of an engine having a variable valve lift apparatus according to an exemplary embodiment of the present invention includes an engine 10, an intake valve 16, an exhaust valve 18, a variable valve lift apparatus (VVL) 20, and a controller 30.

The engine 10 generates power by combustion of fuel. That is, the engine 10 is provided with the intake valve 16 for supplying an air/fuel mixture and the exhaust valve 18 for discharging burned gas.

The intake valve 16 and the exhaust valve 18 are opened and closed by a valve lift apparatus connected to a crankshaft.

Two intake valves 16 and two exhaust valves 18 are provided in the cylinder, such that an air/fuel amount flowing into the cylinder 12 of the engine 10 is maximized and output of the engine 10 is improved.

The variable valve lift apparatus 20 adjusts a valve lift of the intake valve 16 when the intake valve 16 is opened and closed. That is, the controller 30 adjusts the lift of the intake valve 16 by controlling the variable valve lift apparatus 20 according to a load region of the engine 10. Generally, the variable valve lift apparatus 20 adjusts the valve lift of the intake valve 16 in a low lift mode or a high lift mode by using hydraulic pressure according to a load region of the engine 10.

However, the present invention is not necessarily limited thereto, and a multi-mode or continuously variable valve lift apparatus 20 can be used as necessary. The configuration and operation of the variable valve lift apparatus 20 have been disclosed, and thus repeated descriptions thereof will be omitted.

The controller 30 controls the lift of the intake valve 16 and exhaust valve 18 by using the variable valve lift apparatus 20 according to the load region of the engine 10. The controller 30 may be implemented with one or more microprocessors operated by a predetermined program or hardware including the microprocessor, and the predetermined program includes a series of commands for performing a control method of an engine having a variable valve lift apparatus according to an exemplary embodiment of the present invention to be described below.

Since the engine has a plurality of cylinders 12, some of the cylinders 12 are deactivated according to the load condition of the engine such that fuel consumption can be reduced. Cylinder deactivation is performed by closing the intake valve 16 and the exhaust valve 18.

The controller drives the intake valve 16 or the exhaust valve 18 in a low lift mode by using the variable valve lift apparatus 20 when the cylinder 12 is deactivated.

As such, when the intake valve 16 or the exhaust valve 18 is driven in the low lift mode while the cylinder 12 is deactivated, an explosive gas or intake air trapped in the cylinder can be exhausted to the outside. Therefore, pressure in the cylinder 12 can be constantly maintained. Further, negative pressure in the cylinder 12 can be prevented from forming after a predetermined time passes from when the cylinder is deactivated.

Alternatively, the controller 30 may drive one of the valves 16 and 18 in the low lift mode and close the other valves 16 and 18 while the cylinder 12 is deactivated. That is, the controller 30 drives one of the four valves 16 and 18 in the low lift mode and closes the other valves.

As such, when one intake valve 16 or one exhaust valve 18 is driven in the low lift mode, friction of the other valves can be minimized.

Figure 3:
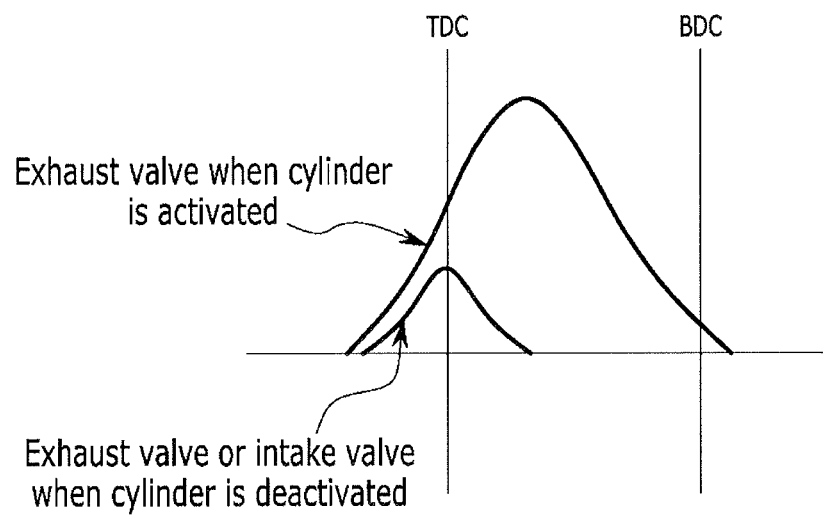
FIG. 3 is a graph illustrating a valve phase of a variable valve lift apparatus according to an exemplary embodiment of the present invention.
Figure 3:
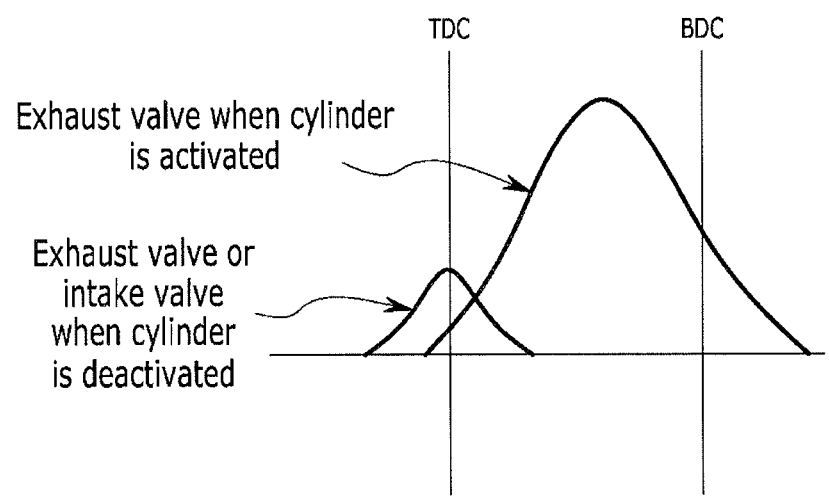

FIG. 3 is a graph illustrating a valve phase of a variable valve lift apparatus according to an exemplary embodiment of the present invention.

As shown in FIG. 3, it is preferable that the controller 30 controls opening timing of the intake valve 16 or the exhaust valve 18 to be equivalent to top dead center or bottom dead center of a piston 14 when the intake valve 16 or the exhaust valve 18 is driven in the low lift mode.

When the opening timing of the intake valve 16 or the exhaust valve 18 is equivalent to top dead center or bottom dead center of the piston 14, a compression load and an expansion load of the intake valve 16 or exhaust valve 18 driven in the low lift mode become equivalent. Therefore, resistance applied to the piston 14 can be minimized.

Hereinafter, a control method of an engine having a variable valve lift apparatus according to an exemplary embodiment of the present invention will be described in detail.

Figure 4:
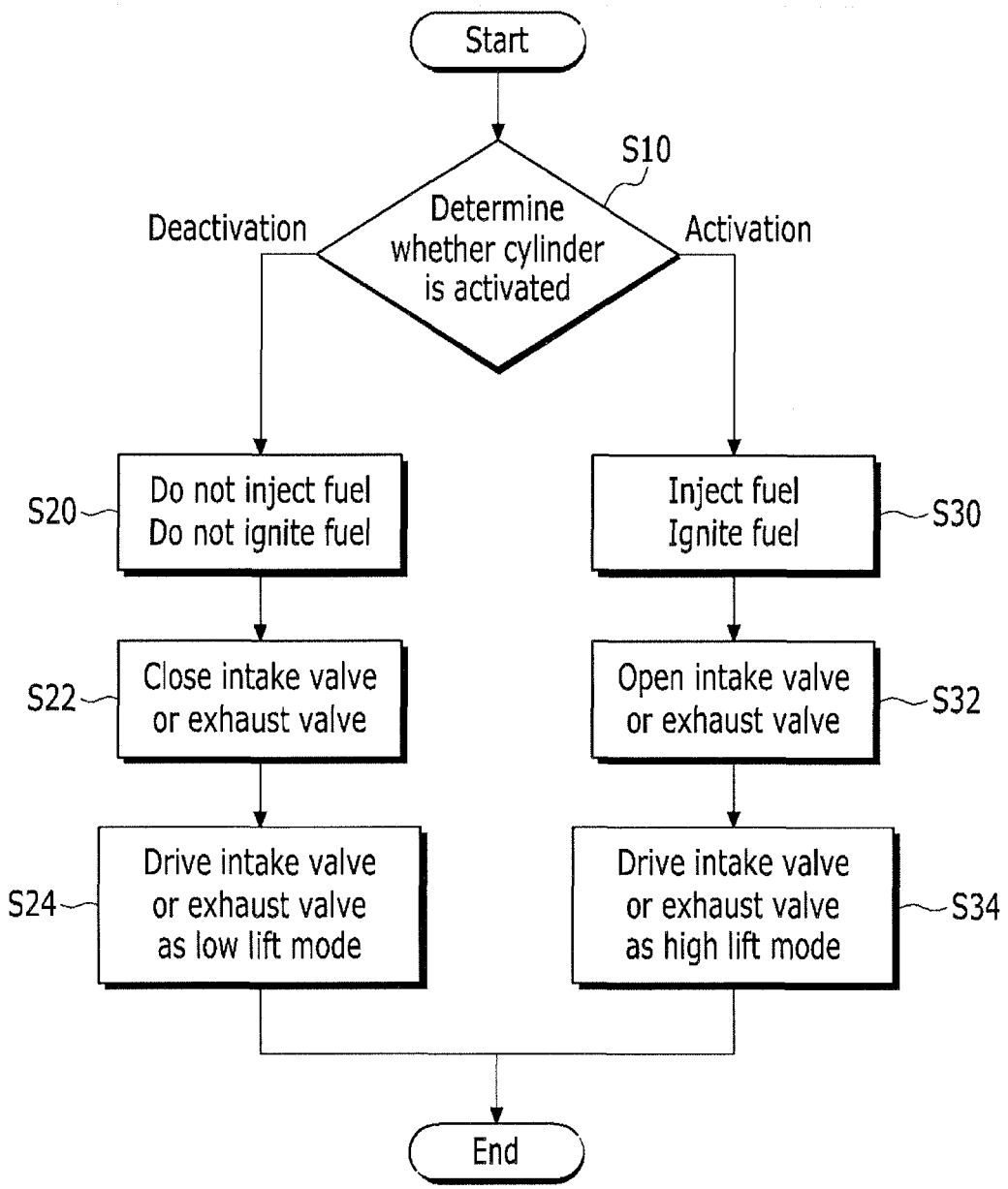
FIG. 4 is a flowchart illustrating a control method of an engine having a variable valve lift apparatus according to an exemplary embodiment of the present invention.

FIG. 4 is a flowchart illustrating a control method of an engine having a variable valve lift apparatus according to an exemplary embodiment of the present invention.

As shown in FIG. 4, the controller 30 determines whether the cylinder is deactivated from driving information of the vehicle at step S10.

When the controller 30 determines that the cylinder is deactivated, the controller 30 does not inject fuel to the deactivated cylinder and does not ignite fuel in the deactivated cylinder at step S20. The controller 30 closes the intake valve 16 or the exhaust valve 18 corresponding to the deactivated cylinder 12 at step S22.

The controller 30 drives the exhaust valve 18 or the intake valve 16 that is not closed in the low lift mode by using the variable valve lift apparatus 20.

In the step S10, when the cylinder 12 is activated, the controller 30 controls to inject fuel to each cylinder 12 and ignite fuel in the cylinder 12 at step S30. The controller 30 opens the closed intake valve 16 or exhaust valve 18 at step S32, and controls the intake valve 16 or exhaust valve 18 in the high lift mode at step S34.

As described above, according to an exemplary embodiment of the present invention, pressure in the cylinder is constantly maintained by driving the intake valve or the exhaust valve in the low lift mode while the cylinder is deactivated. Therefore, impact or vibration generated by pressure of the explosive gas or intake gas trapped in the cylinder can be minimized, and a time for activation of the cylinder can be reduced.

According to an exemplary embodiment of the present invention, pressure of a cylinder can be constantly maintained by driving an intake valve or an exhaust valve in a low lift mode while the cylinder is deactivated.

Further, an impact or a vibration generated in an engine can be suppressed by constantly maintaining pressure of a cylinder while the cylinder is deactivated.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A control method of an engine having a variable valve lift apparatus comprising at least one intake valve and at least one exhaust valve for opening and closing a cylinder provided in an engine, the variable valve lift apparatus adjusting a valve lift of an intake valve and an exhaust valve, and a controller controlling a lift of the intake valve and the exhaust valve by using the variable valve lift apparatus,
   wherein the controller is configured to execute:
      determining whether the cylinder is deactivated; and
      closing the exhaust valve and driving the intake valve in a low lift mode when the cylinder is deactivated,
   wherein the controller is configured to control opening timing of the intake valve to be equivalent to a time that a piston reaches to top dead center or bottom dead center of the piston reciprocating in the cylinder.

2. The control method of the engine having the variable valve lift apparatus of claim 1,
   wherein the intake valve included as a pair, and
   wherein a first intake valve of the pair of intake valves is driven in the low lift mode and a second intake valve of the pair of intake valves is closed when the cylinder is deactivated.

3. A control method of an engine having a variable valve lift apparatus comprising at least one intake valve and at least one exhaust valve for opening and closing a cylinder provided in the engine, the variable valve lift apparatus adjusting a valve lift of an intake valve and an exhaust valve, and a controller controlling a lift of the intake valve and the exhaust valve by using the variable valve lift apparatus,
   wherein the controller is configured to execute:
   determining whether the cylinder is deactivated from driving information of a vehicle; and
   closing the intake valve and driving the exhaust valve in a low lift mode when the cylinder is deactivated,
   wherein the controller is configured to control opening timing of the intake valve to be equivalent to a time that a piston reaches to top dead center or bottom dead center of the piston reciprocating in the cylinder.

4. The control method of the engine having the variable valve lift apparatus of claim 3,
   wherein the exhaust valve is included as a pair, and wherein a first exhaust valve of the pair of exhaust valves is driven in the low lift mode and a second exhaust valve of the pair of exhaust valves is closed when the cylinder is in an idle state.

* * * * *